United States Patent
Suzue (10) Patent No.: US 6,618,166 B1
(45) Date of Patent: Sep. 9, 2003

(54) TANDEM IMAGE FORMING SYSTEM (75) Inventor: Tadashi Suzue, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/430,393

(22) Filed: Oct. 29, 1999

(30) Foreign Application Priority Data

Nov. 6, 1998 (JP) .......................................... 10-330264

(51) Int. Cl.⁷ .............................................. G06K 15/00
(52) U.S. Cl. ..................................... 358/1.15; 358/1.16
(58) Field of Search ........................ 358/1.1, 1.2, 1.15, 358/1.16, 1.18, 402, 403, 449, 450, 451, 453; 707/10, 101, 104.1, 515, 516, 530

(56) References Cited

U.S. PATENT DOCUMENTS 5,479,584 A * 12/1995 Curry .......................... 358/1.2
6,278,528 B1 * 8/2001 Ohtsuka et al. ............ 358/1.15

* cited by examiner

Primary Examiner—Arthur G. Evans
(74) Attorney, Agent, or Firm—Frishauf, Holtz, Goodman & Chick, P.C.

(57) ABSTRACT

An image forming apparatus is provided with an interface connected to a network so as to send or receive data; a memory to store a resident communication program to communicate with another image forming apparatus through the network, wherein the resident communication program establishes channel information regarding data communication among a plurality of image forming apparatus connected with the network based on data regarding other image forming apparatus sent through the network; a recording device to form an image on a recording medium based on image data; and an overall control device to control overall the image forming apparatus comprising the interface, the memory and the recording device.

11 Claims, 9 Drawing Sheets

TANDEM IMAGE FORMING SYSTEM

BACKGROUND OF THE INVENTION

The present invention relates to an image forming apparatus, an image forming system and an image forming method wherein a plurality of image forming apparatuses such as copying machines are connected through networks, image data obtained through reading are transmitted and received reciprocally, and plural image forming apparatuses share an amount of image output to output images in parallel. A system wherein image data are transmitted and received reciprocally and plural image forming apparatuses output images in parallel by sharing image output with one another is hereinafter called a tandem image forming system, and an image forming method employing that system is called a tandem image forming method.

As a tandem image forming system, there has been known a system wherein a plurality of image forming apparatuses are connected through exclusive cables. When connected through exclusive cables, even when an image forming apparatus which has read an image is arranged to transmit image data to all other image forming apparatuses connected through exclusive cables, no bad influences have been exerted on other equipment because of the closed nature of the system, and no problem has been caused in particular. Accordingly, there has been taken a structure wherein an image forming apparatus whose copy key has been pressed reads an image to become a master machine, and it sends image data thus read to the exclusive cable without considering targets in particular, then other image forming apparatuses connected to the exclusive cable become slave machines to receive image data sent from the master machine. Further, in the case of a tandem image forming system employing a general purpose network, there has been structured so that a server for centralized control of each image forming apparatus is provided separately to control each image forming apparatus.

For example, when no centralized control server is provided in general purpose networks such as an internet, each copying machine can not get knowledge of a copying machine of a target, and thereby can not operate as a tandem copying machine. Therefore, it necessary to input the target manually in each copying machine, which causes cost. It is also possible to consider to arrange a tandem copying machine by broadcasting image data simply and thereby by sending data to all equipment. This method, however, is not preferable because large data of image are sent through all networks in this method and communications of other equipment are interrupted.

SUMMARY OF THE INVENTION

As stated above, each copying machine needs to be capable of controlling tandem copying in the tandem copying system, and an object of the invention is, in consideration of the problem mentioned above, to provide a tandem image forming system and a tandem image forming method wherein tandem operations can be carried out, without a special control server, on general purpose networks to which plural image forming apparatuses such as copying machines are connected.

The above object can be attainined by the following structure and method.

An image forming apparatus, comprises:
an interface connected to a network so as to send or receive data;
a memory to store a resident communication program to communicate with another image forming apparatus through the network, wherein the resident communication program establishes channel information regarding data communication among a plurality of image forming apparatus connected with the network based on data regarding other image forming apparatus sent through the network;
a recording device to form an image on a recording medium based on image data; and
an overall control device to control overall the image forming apparatus comprising the interface, the memory and the recording device.

An image forming system, comprises:
a plurality of image forming apparatus each connected to a network capable of conducting a broadcast communication;
each of the plurality of image forming apparatus comprising a resident communication program to communicate with another image forming apparatus through the network, wherein the resident communication program establishes channel information regarding data communication among a plurality of image forming apparatus connected with the network based on data regarding other image forming apparatus sent through the network; and
each of the plurality of image forming apparatus sending image data to or receiving the image data from other image forming apparatus on the basis of the channel information through the network and sharing image formation with others so as to conduct the image formation in parallel together with others.

An image forming method of outputting images in parallel by a plurality of image forming apparatus connected to a network capable of conducting a broadcast communication, comprising steps of:
sending data regarding an image forming apparatus itself through the network;
receiving data regarding other image forming apparatus sent through the network;
establishing channel information regarding data communication among a plurality of image forming apparatus by a resident communication program based on the received data regarding the other image forming apparatus sent through the network;
sending the channel information to the other image forming apparatus through the network; and
outputting images in parallel by the plurality of image forming apparatus based on the channel information.

Further, the above object may be attained by the following preferable structure.

Namely, in copying machines capable of conducting tandem operations in the general purpose network constituted with an equipment (hub) connecting two copying machines each having a communication interface or connecting plural copying machines, the following conditions of arrangement need to be satisfied.

(1) A resident communication program for communicating with other copying machines can be operated in each copying machine.

(2) A network can conduct communication for distributing given data to tandem programs of all copying machines on the network.

(3) A unique number (identification (ID) number) capable of comparing sizes is allocated to each copying machine.

In the tandem image forming system of the invention in which plural image forming apparatuses such as copying machines are connected to a network and image data are exchanged through the network to form images, each of the plural image forming apparatuses operates a resident communication program for communicating with other image forming apparatuses, the network mentioned above can conduct broadcast communication and establishes channel information for the resident communication program with broadcast message in accordance with the state of operation of each image forming apparatus, and tandem image forming operations are carried out by conducting communication on the aforesaid network by the use of the established channel information.

In the invention, channel information which conducts tandem image forming operations in the network to which a plurality of image forming apparatuses are connected is established in accordance with the state of operation of each image forming apparatus. It is therefore possible to comply with a change in the structure of the network. For example, when a certain image forming apparatus is not operating, channel information is established by excluding the image forming apparatus, or when a certain image forming apparatus is operated afterward, establishment of channel information can be made taking that image forming apparatus into consideration. Further, each image forming apparatus controls another image forming apparatus each other so that each control information and image data can be exchanged through network communication of the channel information. Therefore, it is possible to operate a tandem image forming apparatus such as a tandem copying machine without a special control server in the general purpose network. Since it is possible to operate a tandem image forming apparatus on an ordinary network employing a exclusive cable, therefore, less plant investment is required, and a tandem image forming system which is more complicated or more flexible than a exclusive cable can be constituted. It is further possible to structure a tandem image forming system simply at low cost, because a special control server which controls each image forming apparatus is not required.

It is further possible to arrange so that the aforesaid resident communication program of each image forming apparatus compares identification information given to each image forming apparatus to determine one of the plural image forming apparatuses as a server, and the image forming apparatus thus determined controls as a serve other image forming apparatuses as a client. Owing to the comparison of identification information of each image forming apparatus, a server and a client can be determined and the server can control each client.

When an arrangement is made so that the time of the server is synchronized with that of the client, it is convenient for control of transmission of image data. It is further possible to accurately conduct measurement of efficiency of data transmission which will be described later.

It is further possible to arrange so that data transmission efficiency is measured between the aforesaid server and the client, and the tandem image forming operations mentioned above are conducted based on the measured transmission efficiency. Due to this, when large amount of data can not be transmitted because of low quality of the line, for example, or when the transmission speed is low, it is possible to take measures to reduce an amount of data by enhancing the rate of compression for image data. It is further possible to take means to notify waiting time by indicating, on a graph, the time required for communication which can be obtained from an amount of data and the rate of transmission.

Further, the tandem image forming method of the invention is a tandem image forming method in which plural image forming apparatuses are connected to a network, and image data are exchanged through the network for image forming, wherein a resident communication program for each of the plural image forming apparatuses to communicate with other image forming apparatuses is operated, and the network can conduct broadcast communication, and a step to establish channel information for the resident communication program in accordance with broadcast message and the state of operation of each image forming apparatus and step to conduct tandem image forming operations by performing communication on the network by the use of the established channel information are included.

Further, in the tandem image forming method, it is possible to arrange so that a step in which the resident communication program of each image forming apparatus compares identification information given to each image forming apparatus to determine one of the plural image forming apparatuses as a server, is further included, and this image forming apparatus thus determined controls, as a server, other image forming apparatuses as a client. It is further possible to arrange so that a step in which the time of the server is synchronized with that of the client before the tandem image forming operations and a step to measure the data transmission efficiency between the server and the client are included, and the tandem image forming operations are conducted based on the efficiency of transmission obtained through the aforesaid measurement.

DETAILED DESCRIPTION OF THE PREFERRED EMBODIMENT

Figure 1:
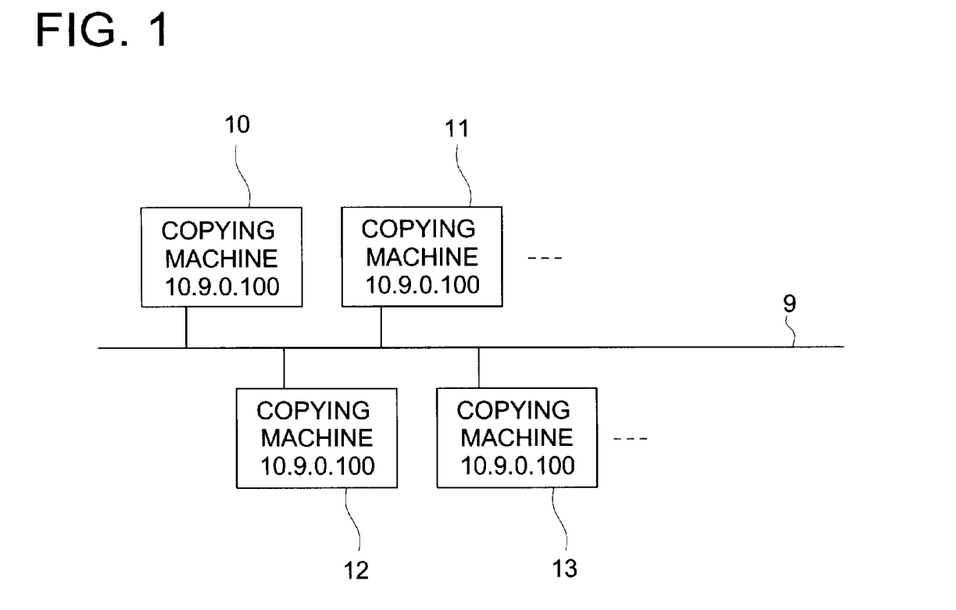
FIG. 1 is a diagram showing the basic structure of a tandem copying system of an embodiment of the invention.
Figure 2:
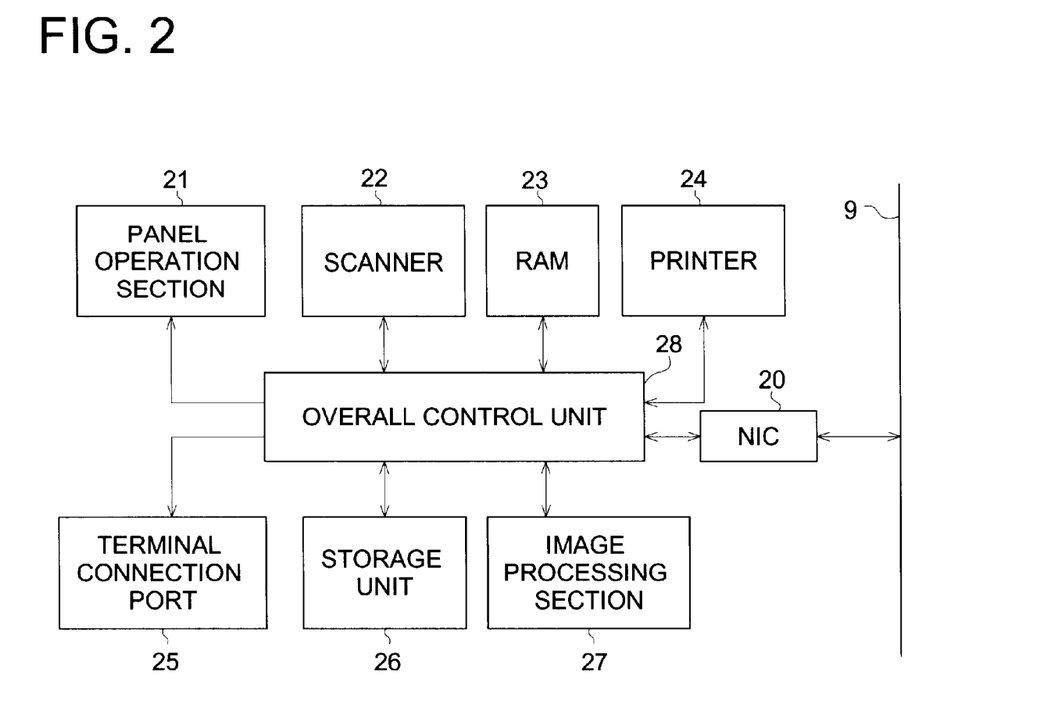
FIG. 2 is a block diagram showing the structure of the copying machine in FIG. 1.

An embodiment of the invention will be explained as follows, referring to the drawings. FIG. 1 is a diagram showing the basic connection of a tandem copying system of the embodiment of the invention wherein a plurality of copying machines representing an image forming apparatus are connected, and FIG. 2 is a block diagram showing the basic structure of each copying machine in FIG. 1.

In the tandem copying system of the present embodiment, an address of the copying machine of a target is specified when sending data, because the address of the copying machine of a target is not made clear by only connection to the general purpose network, and therefore, it is considered that a list of addresses of other copying machines used in tandem copying is inputted in the master side. However, it is time-consuming to input a list, and it is substantially impossible to take actions when network formation is changed (for example, when a power supply for a certain copying machine is turned off). Further, the master in the course of tandem operations is the side where a copy key is pressed, and when a copy key of a certain copying machine is pressed, a list needs to be inputted in all copying machines. To avoid such time and labor, it is indispensable to exchange an address list of each copying machine in the case of a tandem copying machine which is connected to a general purpose network and has no control server, which has not been considered in the conventional tandem copying machine with a exclusive cable and in the copying machine with a control server. In the present embodiment, tandem image forming apparatuses such as tandem copying machines can be operated in the general purpose network where no control server is provided.

As shown in FIG. 1, a plurality of copying machines 10, 11, 12 and 13 each having a different ID number (for example, IP address value in an internet) are connected to common bus 9, and due to this, one network is formed. Basic operations in this network are as follows.

1. Each ID number is compared, and the smallest one, for example, is determined to be a server, and this determination is made automatically between copying machines without intermediation of a server.
2. Time synchronization between the server and all clients are conducted, and an amount of transmittable data is measured.
3. From each copying machine, tandem operations are conducted with one or more copying machines.

The present embodiment is a tandem copying system in the automonous network stated above wherein an internet is used. To simplify the explanation, the internet in this case represents a closed local network which is connected neither with a router nor with external networks. However, the internet operates even when it is connected to an external network, and it is one which operates in the general purpose network.

As shown in FIG. 2, each of the copying machines 10–13 is provided with Ethernet NIC (network interface controller) 20 connected to common bus 9, panel operating section 21 which operates each function of a copying machine, scanner 22 which reads an image from a document, RAM 23, printer 24 which forms images on a recording medium such as a recording sheet from image signals, terminal connection port 25, storage unit 26, image processing section 27, and overall control unit 28 which is connected to all of the sections 20–27 and controls all of them.

Further, it is possible to set the time in each of copying machines 10–13. This time setting has therein panel operating section 21 of a copying machine, terminal connection port 25 connected by a line, or an interface which synchronizes with a time server after connection with a network.

Further, through interface of panel operating section 21 of each copying machine or of terminal connection port 25 connected by a line, it is possible to input information which is required for connection of network such as host IP address. Incidentally, it is also possible to set automatically by providing a server for DHCP (Dynamic Host Connguration Protocol) which automatically determines host IP address and others.

Each copying machine can always execute network resident communication program (hereinafter referred to as "tandem program"), and it can conduct exchange of data using socket communication. The data represent control specification information for constituting a tandem copying system, image data information and information for control and change of the state of a copying machine, and each information can be transmitted and received simultaneously.

A tandem program is housed in storage unit 26 which is composed of ROM, non-volatile memory and a hard disk, and OS (operating system) of a copying machine conducts an actual execution. With regard to OS, the ones such as real time system RTOS (real time OS) and a multi-task system which can operate plural programs simultaneously are used.

Each program has RAM 23 representing a memory capable of reading and writing, and information (such as ID which will be described later) necessary for tandem operations can be handled dynamically on the memory. Namely, even when a copying machine changes between operation and non-operation and a list of copying machines capable of conducting tandem operations is changed in time series, it is possible to handle information necessary for tandem operations, to comply with that change. It is further possible, for this, to utilize a hash table, a sorting means or a function of data base.

The network is one which can conduct socket communication, broadcasting or multi-casting, like an internet, for example. It is also arranged so that broadcasting or multi-casting can be conducted from NIC 20.

Next, an example of algorithm at the start of execution of tandem operations where a copying machine shown in FIG. 2 is used will be explained, referring to FIG. 3–FIG. 7. Incidentally, PAD (Problem Analysis Diagram) is used for explanation of algorithm for determination of a server.

Figure 3:
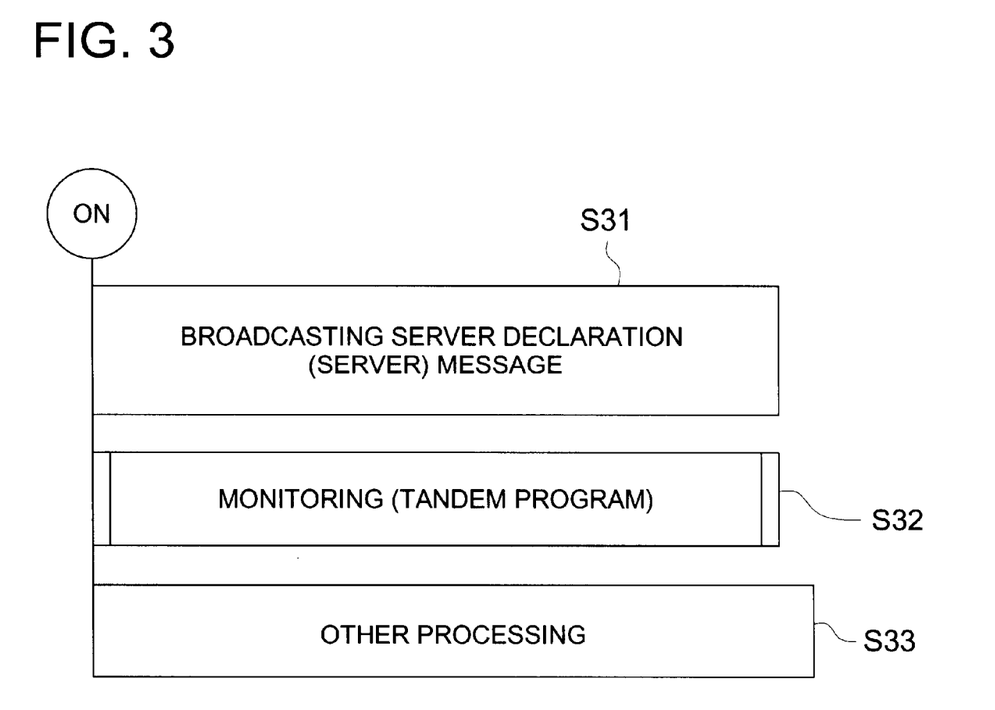
FIG. 3 is a flow chart showing operations conducted after the copying machine is turned on, in the tandem copying system in FIG. 1.

When a power supply for a copying machine is turned on, initialization of OS is completed, and a tandem program representing a resident communication program is started, execution is started from "on" in FIG. 3. The tandem program searches for other copying machines connected to the network capable of conducting tandem operations. This searching process is called tandem negotiation.

As shown in FIG. 3, the copying machine to which power source is supplied makes a server declaration first to the network to which the copying machine is connected (S 31). The server declaration in this case is to send tandem control specification information to tandem programs of all copying machines connected to the network. Transmission of this kind is called broadcasting.

Next, after the broadcasting transmission stated above, the copying machine conducts monitoring of control specification information (S 32). This monitoring is executed by the program which is initiated from the tandem program and is called an independent task. Due to this, after initiation, the control specification information and information packet running to other networks are constantly monitored. In addition, the control specification information changes information of servers and clients. The tandem program conducts establishment related to tandem operations, after initiating monitoring.

In this case, the control specification information stated above requires following messages.
1. SERVER: Server declaration
2. CLIENT: Client specification
3. CLIENT-ACCEPT: Client accept
4. CHANGE-SERVER: Change-server command 5. CHANGE-ACCEPT: Change-server accept
6. OFFLINE: Host offline Each of the messages mentioned above is added to control specification information together with necessary secondary information, and a tandem program (monitoring) determines processing depending on the type of the control specification information which is received by the tandem program.

Figure 4:
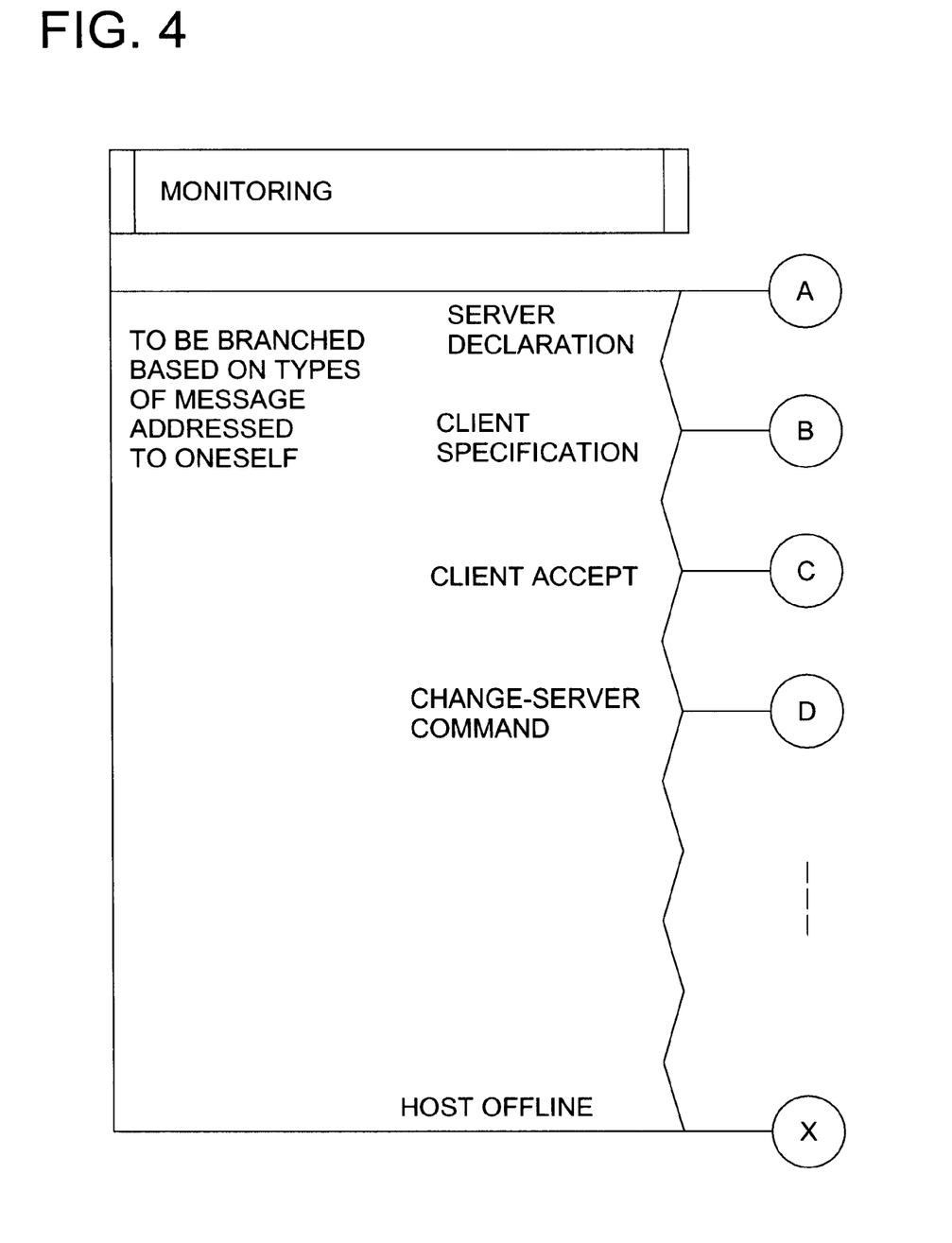
FIG. 4 is a flow chart diagram showing that each control designating information is branched depending on the type of monitoring shown in FIG. 3.

As shown in FIG. 4, messages in monitoring are branched depending on their types (A), (B), (C), (D), . . . , (X). Server declaration is broadcasted in a local network. In the recent internet, when a subnetwork is not provided in a network of class C, for example, IP addresses of broadcast messages of hosts 202, 248, 128 and 100 are 202, 248128 and 255 in general. By sending control specification information to these IP addresses, it is possible to send the same control specification information to all copying machines connected respectively to networks 202, 248 and 128. Incidentally, with regard to port numbers used for socket communication, in the case of socket communication, it is necessary to use the port number which is common in tandem programs.

When an IP address is used as a method to determine a server, the IP address is expressed, in its version 4, with four pieces of 8 bit numerical value, and it is equivalent to the numerical value which can be expressed by 32 bit exclusive of an exception of numerical values which can not be used as an IP address. There is used a method wherein the numerical values are compared, and a server is determined depending on the size of the numerical value. Further, in the same way, it is also possible to utilize a MAC address attached to NIC 20.

In the present embodiment, a copying machine having a smaller numerical value is made to be a server, and in comparison in plurality, the one having a smaller numerical value is basically processed on a priority basis. It is naturally possible, on the contrary, to make the one having a greater numerical value to be a server. It is also considered to take the more efficient comparing method by using another type of network when a method to express the numerical value is changed. Therefore, this numerical value (IP address) will be described simply as ID after this.

The control specification information needs to have at least an ID of a copying machine of an originator, an ID of a transmission destination, and information about contents of messages. Further, it is possible to add secondary information, depending on the message. The server compares its ID with an ID of the copying machine which sent a message of server declaration, and when the server ID is smaller, the server sends a client specification message to a target so that the target may tell that the target is a client. When the target receives the client specification message to confirm that the target is not a server, the target sends a client accept message to the server which sent the client specification message to the target.

Further, when the present server is changed in the case when the server becomes unable to perform its duties as a server because the power supply is cut, for example, or when the server receives wrong server declaration messages in the course of tandem negotiation, server change command messages are used. Details will be described later.

When the copying machine is unable to conduct tandem operations because of troubles of NIC 20 or of unexpected failure of the power source, and when it is necessary to conduct operations for searching a target such as server declaration stated below at a certain interval to confirm existence of the target, or when turning off the power source, it is possible to end tandem operations without unnecessary confusion by using host offline messages.

Figure 5:
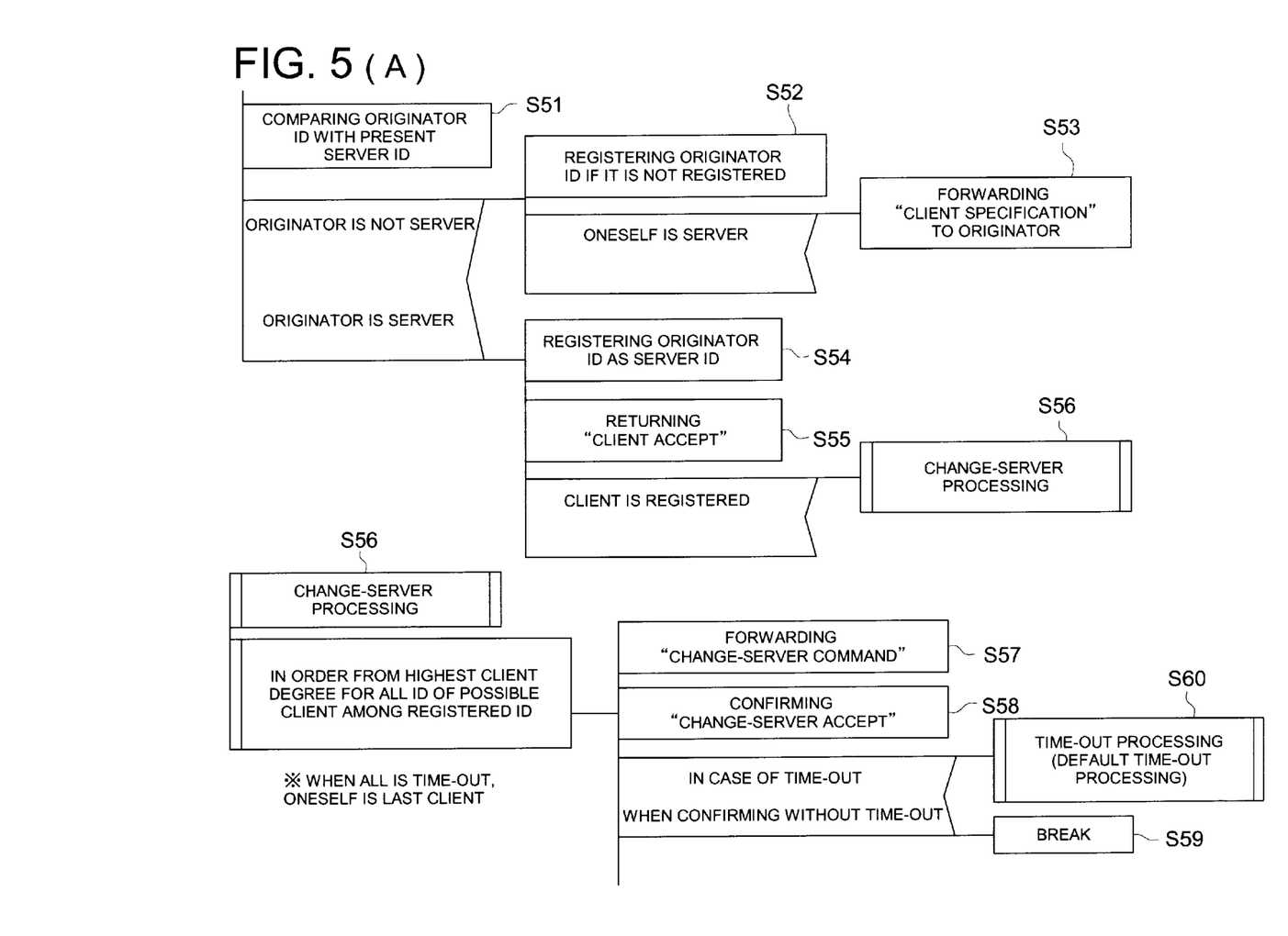
FIG. 5 is a flow chart diagram illustrating processing (A) of monitoring shown in FIG. 3.
Figure 6:
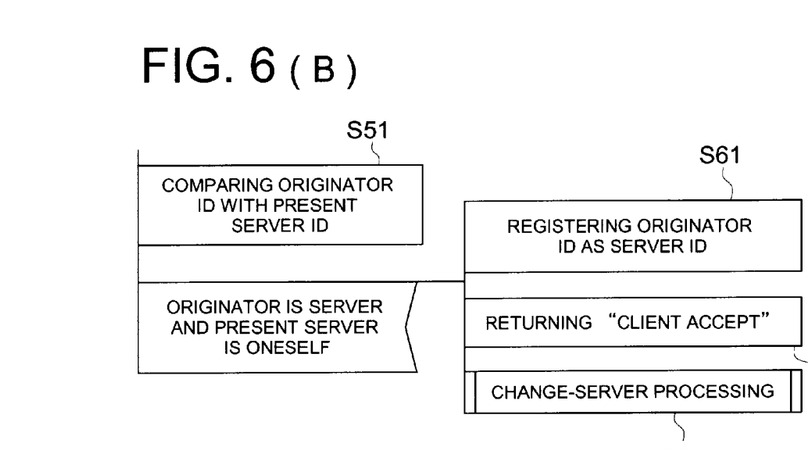
FIG. 6 is a flow chart diagram illustrating examples of processing (B), (C), (D), and (X) of monitoring shown in FIG. 3.

Next, contents of processing of each message will be described in detail as follows, referring to FIG. 5 and FIG. 6. Each processing shown in each of FIG. 5 and FIG. 6 is conducted by each message explained. Incidentally, "comparing ID" in the following description means "to compare an ID of an originator with an ID of the present server in terms of size, and to make the smaller one to be a server". With regard to the ID size, there sometimes exists an occasion where both are the same.

As shown in FIG. 5, in processing (A), Ids are compared (S51), and when an originator is not a server and originator ID has not been registered yet, the originator ID is registered (S52). Further, if a receipient itself is a server, client specification messages are sent to the receipient (S53). On the contrary, when Ids are compared (S51) and when a originator is a server and present receipient itself is a server, the receipient is registered as a present server (S54) and client accept messages are sent back from the receipient (S55). When a client has already been registered, server change processing is also conducted (S56).

In the further explanation of the server change processing (S56), basic structure is a loop in which the processing is conducted in succession from the highest client degree (smallest ID) among those which are registered and can be a client, namely, among Ids smaller than ID of its own. When the number of registrations is zero, nothing is conducted.

Server change processing (S56) is to send a server change command message to registration ID first (S57), and to confirm its response representing the server change accept message (S58). If the confirmation is finished within a certain period of time, the loop is subjected to breaking (S59), while, when the confirmation is not finished within a certain period of time to be time-out, time-out processing which will be described later is conducted (S60).

Next, processing (B) will be explained. Ids are compared (S51), and when the originator is a server and the receipient itself is a server presently, originator ID is registered as a present server (61). A client accept message is sent back to the originator from the receipient (S62), and server change processing (S56) which is the same as the foregoing is conducted.

When the originator is not registered in processing (C) under the state stated above, the originator is registered as a client (S63). This is the second smallest ID to that of its own among registered data. When the receipient itself is not a server, server change processing (S56) which is the same as the foregoing is conducted.

In processing (D), IDs are compared (S51), and when IDs are the same, present server ID is changed to ID specified by the originator with option of control specification information (S64), and a server change accept message is sent back to the receipient from the originator (S65). Further, a client accept message is sent to new server ID (S66), and server change processing (S56) which is the same as the foregoing is conducted.

When the originator ID is registered in processing (X) under the state stated above, it is eliminated (S67). Present server ID is changed to ID of its own (S68), and server declaration is made (S69).

Figure 7:
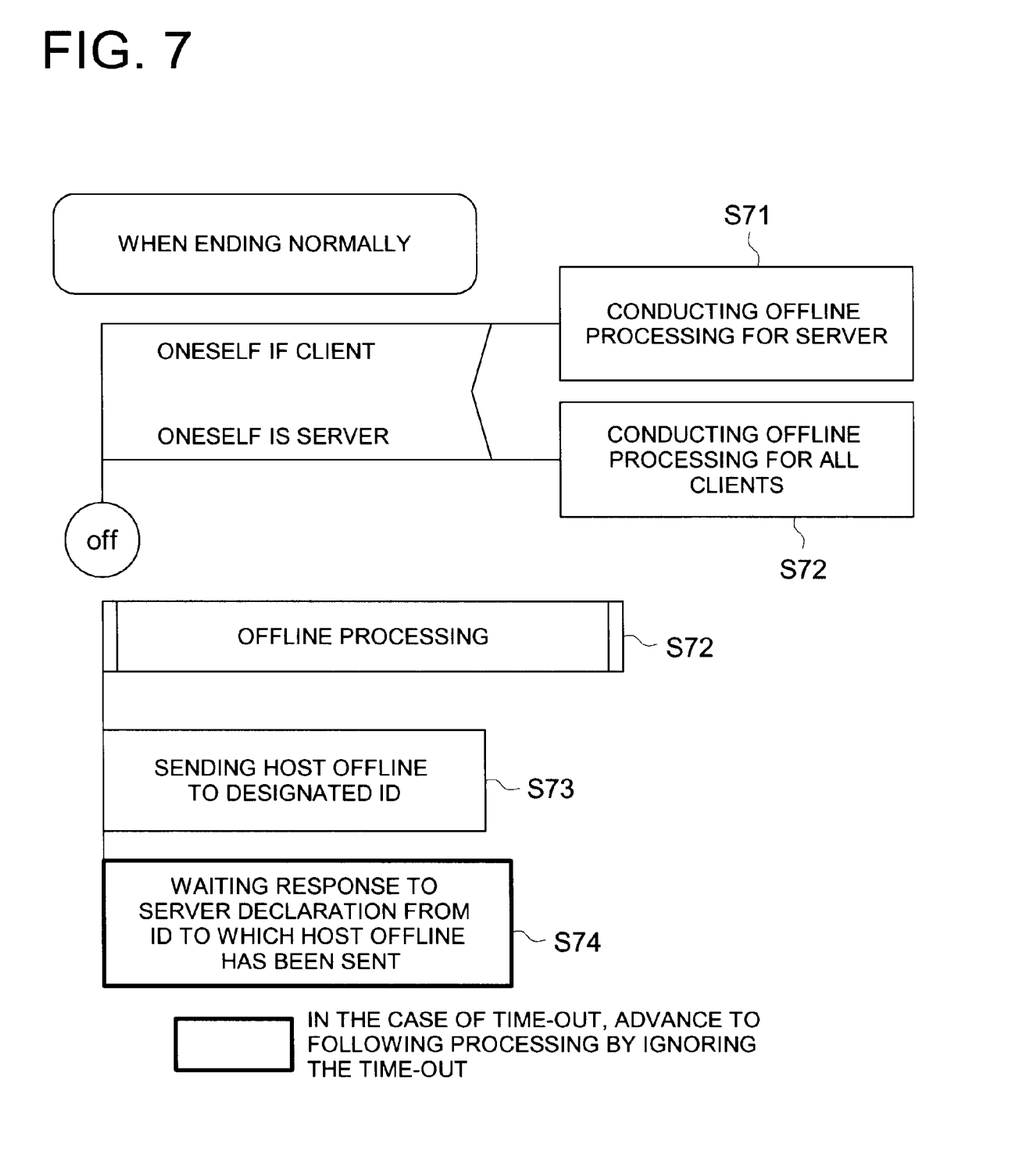
FIG. 7 is a flow chart diagram showing operations to complete the tandem copying system in FIG. 1.

On the occasion of completion of tandem operations by a certain copying machine, when the copying machine itself is a client as shown in FIG. 7, offline processing is conducted to the present server (S71), while when the copying machine itself is a server, offline processing is conducted to all registered clients in the order from the smaller ID (S72). After offline processing is completed, actual tandem operations are completed to be "off".

In the aforesaid offline processing (S72), host offline message is sent (S73), and the response to the server declaration coming from the target is waited (S74). In the case of time-out, this is ignored to advance to the following processing. The purpose of this is not to retry even when the target finishes first.

EXAMPLE 1

As Example 1, there will be explained how control specification information is transferred by the above-mentioned algorithm between two copying machines in FIG. 8. Incidentally, in this case, Ids are made to be numerical values starting from 1000 for convenience' sake, but there is no problem only if the ID of each copying machine is a unique numerical value on a local network.

Figure 8:
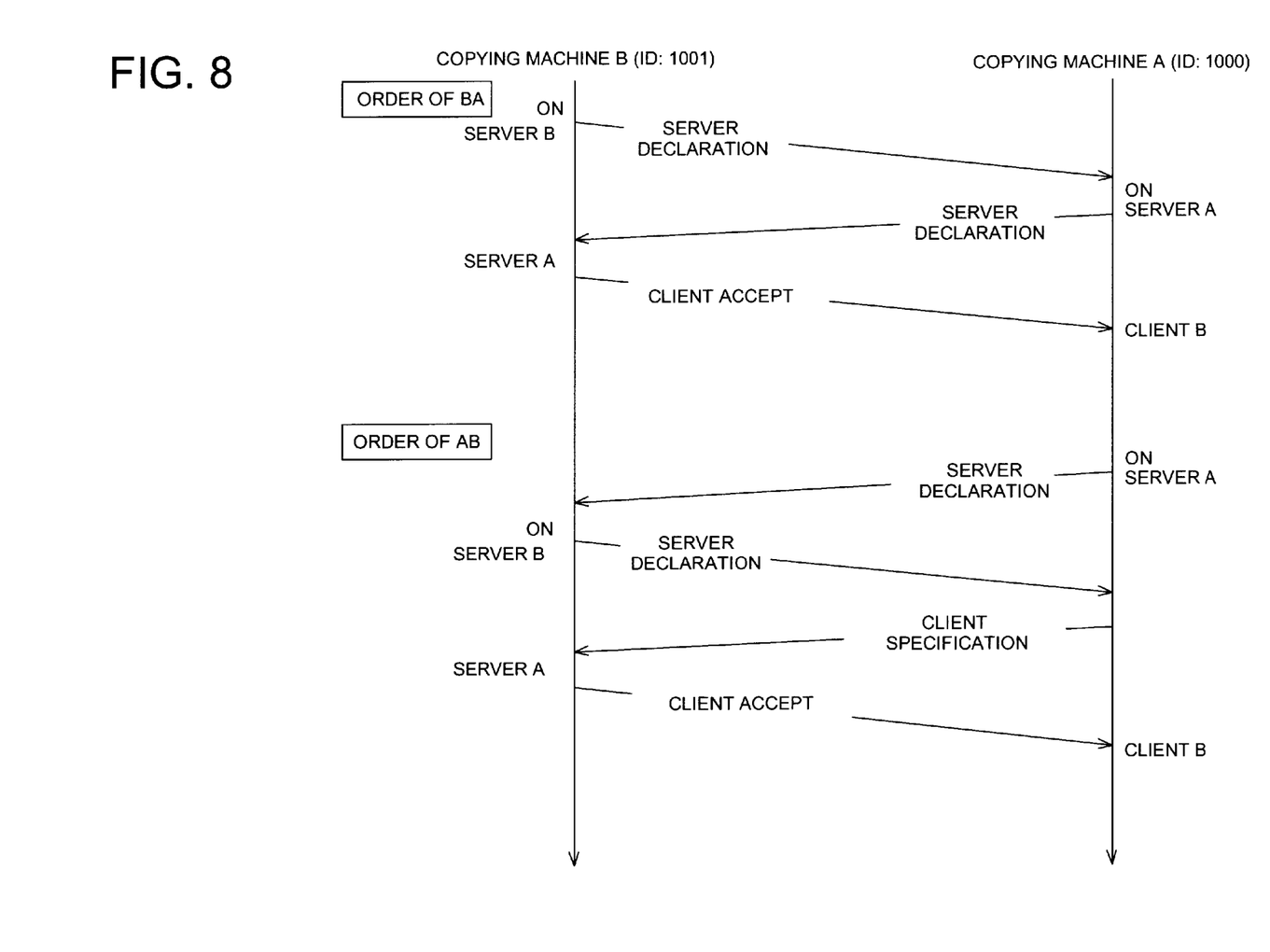
FIG. 8 is a diagram for illustrating procedures to determine a server in Example 1.

When two copying machines A (ID: 1000) and B (ID: 1001) are connected as shown in FIG. 8, a server is determined as follows. First, when the power supply is turned on in the order of BA, the copying machine B (ID: 1001) is initiated first, and it makes server declaration to remain to be a server, because there is no other copying machine initiated. When the copying machine A (ID: 1000) is initiated thereafter, the copying machine B compares ID of the copying machine A with ID of its own, and changes the server to the copying machine A because the ID of the copying machine A is smaller. Then, the copying machine B sends a client accept message back to the copying machine A. After receiving the client accept message from the copying machine B, the copying machine A registers the copying machine B as a client.

Next, when the power supply is turned on in the order of AB, the copying machine BA(ID: 1000) is initiated first, and it makes server declaration. After that, the copying machine B (ID: 1001) is initiated, and after it makes server declaration, client specification message is responded from the copying machine A, thus, the copying machine B learns that the copying machine A is a server. A client accept message is sent from the copying machine B, and the copying machine B is registered as a client.

In Example 1, in either case when the copying machine A is turned on first or the copying machine B is turned on first, the copying machine A having the smaller ID is determined to be a server.

EXAMPLE 2

Figure 9:
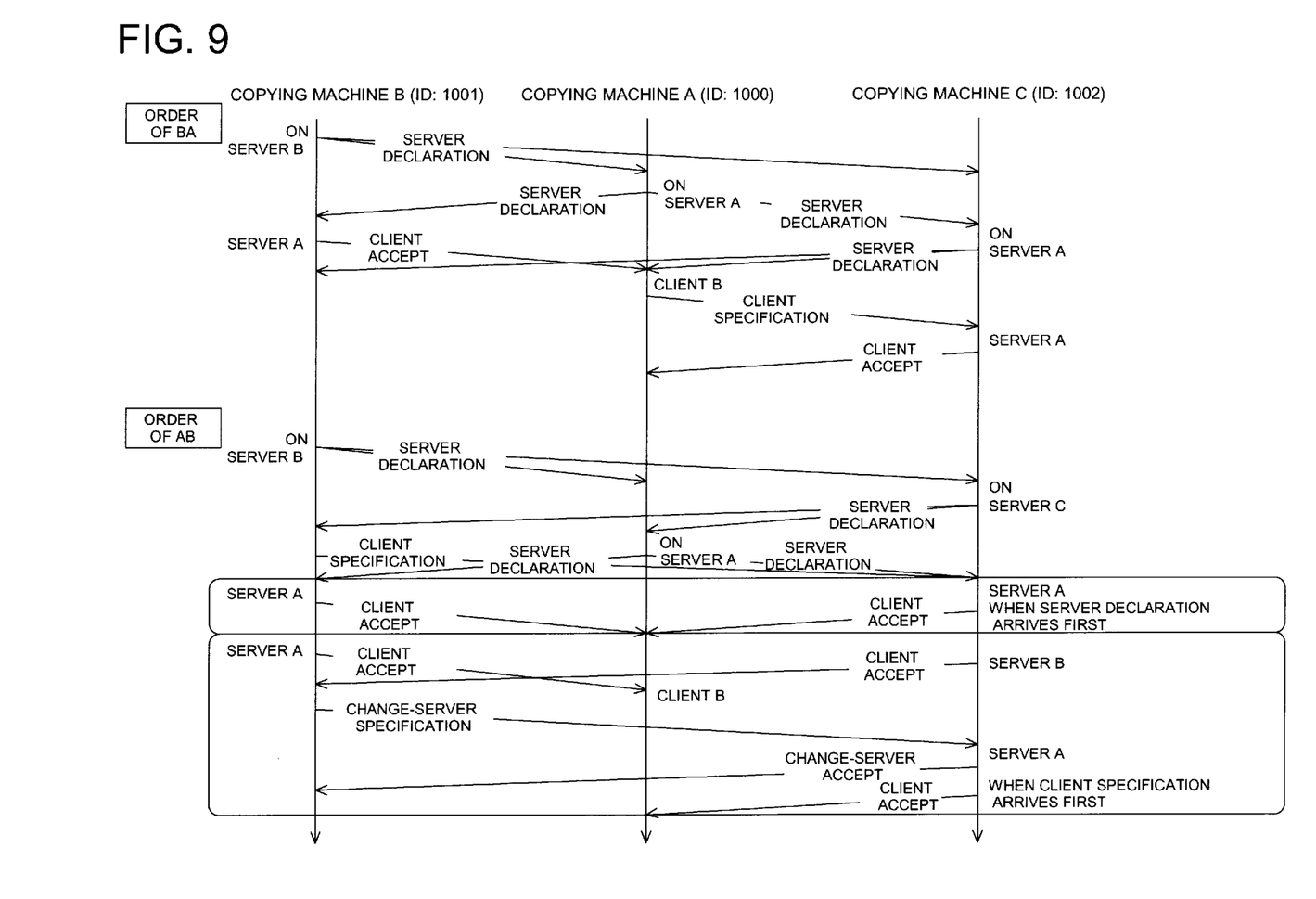
FIG. 9 is a diagram for illustrating procedures to determine a server in Example 2.

As Example 2, there will be explained, by reference to FIG. 9, how a server is determined in three copying machines. The explanation will be given for the occasions wherein copying machine A (ID: 1000), copying machine B (ID: 1001) and copying machine C (ID: 1002) are turned on in the order of BAC and BCA.

When the power supply is turned on in the order of BAC, server declaration is made by the copying machine B first. Then, when the copying machine A is turned on, the copying machine B recognizes that the copying machine A is a server and sends a client accept message back to the copying machine A, thus, it is registered that the copying machine B is a client. On the other hand, even when the copying machine C is turned on and server declaration is made by the copying machine C, a client specification message is sent from the copying machine A to the copying machine C, and the copying machine C recognizes that the copying machine A is a server and sends a client accept message back to the copying machine A. In this way, the copying machine A having the smallest ID among the copying machines A, B and C is determined to be a server.

Next, when the power supply is turned on in the order of BCA, processing varies depending on the order of arrival of control specification information at the copying machine C. The situation of this kind can happen in another case, but there is conducted processing which is the same as that explained below. First, the copying machine B and the copying machine C are turned on in this order, and then, the copying machines A is turned on. When the server declaration from the copying machines A arrives at the copying machine C first, a client accept message is sent back from the copying machine C. Further, a client accept message is sent back also from the copying machine B. Thus, the copying machines A is determined to be a server.

In addition, when a client specification message from the copying machine B arrives at the copying machine C first, a client accept message is sent back to the copying machine B from the copying machine C. Since the copying machine B is not a server in this case (if the copying machine B is a server, the copying machine C is registered as a client), the copying machine B sends a server change specification message to the copying machine C. The copying machine C sends a server change specification accept message back to the copying machine B, and sends a client accept message to the copying machine A which is a server specified by the server change specification from the copying machine C.

In the manner stated above, a server and a client are determined automatically for a copying machine constituting the tandem copying system of the present embodiment. Next, time synchronization between the copying machines of this kind will be explained. It is necessary for actual determination of the time synchronization to wait until the moment when response of client accept is finished and a server is surely determined, and let it be assumed that $\Delta t$ represents the waiting time. After the server is determined, time synchronization is conducted with a client with ID which is registered after a period of $\Delta t$.

For the time synchronization, for example, the server determined automatically as stated above initiates, with itself serving as a time protocol server, a time service server. Then, the server sends control specification information to the client so that the client may conduct time synchronization. After completing time protocol, the client sends the control specification information which tells the completion back to the server. All registered Ids need to be subjected to the time synchronization of this kind. For the time synchronization, it is also possible to use a method like NTP (network time protocol) capable of synchronizing all copying machines. It is also possible to have one wherein a tandem program itself is the same as the time protocol and to conduct time synchronization. Incidentally, when using NTP, it is not necessary to transfer control specification information for time synchronization.

Figure 10:
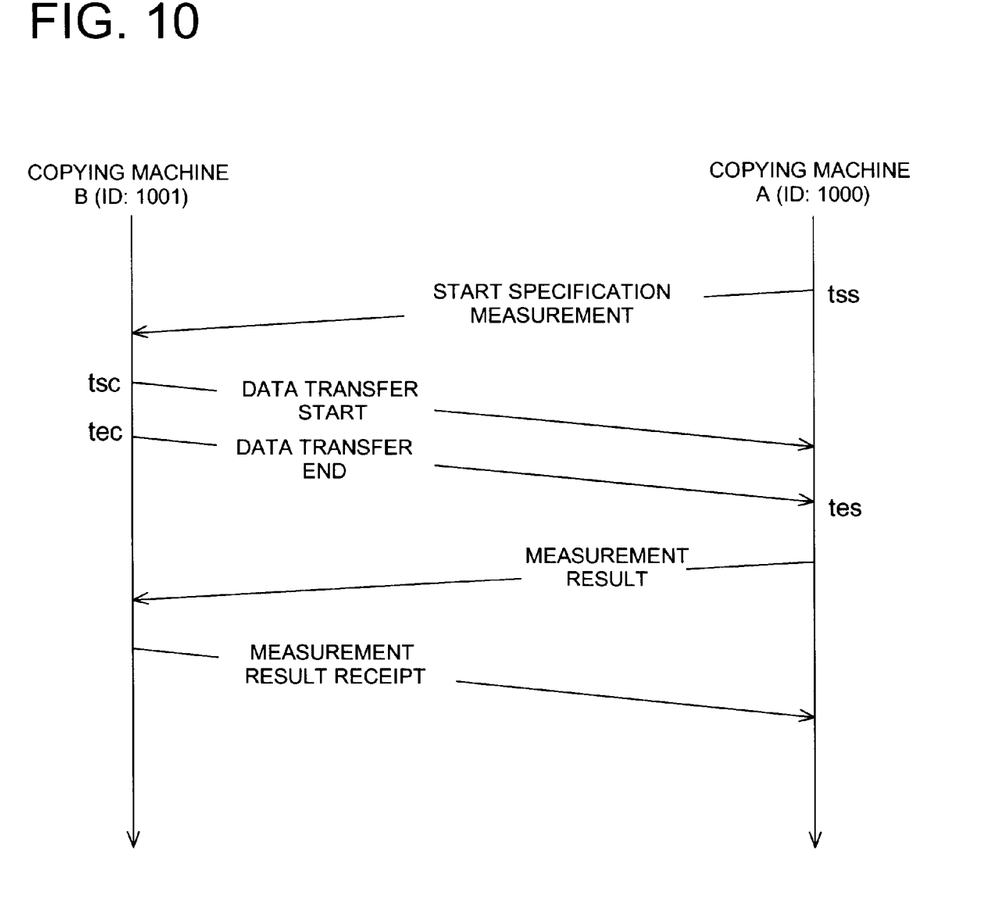
FIG. 10 is a diagram for illustrating procedures for measurement of tandem quality in the tandem copying system of the present embodiment.

Next, measurement of tandem quality in a tandem copying system will be explained, referring to FIG. 10. After time synchronization is completed, data transfer is conducted between a server and a client on a trial basis and transfer efficiency is measured, for the purpose of grasping the level of efficiency with which a copying machine can transfer image data to a target. The results of the measurement serve as reference information for the actual transfer of image data. For example, communication of the following control specification information is conducted between copying machine A (a server) and copying machine B (a client).

1. MEASURE-START-REQUEST: Measurement start specification
2. MEASURE-START: Data transfer start 3. MEASURE-END: Data transfer end
4. MEASURE-RESULT: Measurement result
5. MEASURE-RESULT-GET: Measurement result receipt As shown in FIG. 10, copying machine A representing a server sends a measurement start specification message to copying machine B representing a client which has finished time synchronization. In this case, a numerical value specifying an amount of transfer data is added as secondary data. It is assumed, in this case, that an image data transfer port is ready to receive data. The client starts transferring data and starts transferring test data in an amount specified by the server, simultaneously.

In a data transfer start message, there is added transfer starting time of the client as secondary data. When all data are sent, the client sends a data transfer end message to the server by adding transfer end time as secondary data. After receiving data in a specified amount, the server calculates the following data relating to operation quality of a tandem copying machine.

Let it be assumed that tss represents the time when the measurement start specification is sent, sb represents an amount of data specified, tes represents the time when receipt of all data in amount sb is completed, tsc represents the time of data transfer start, tec represents the time of data transfer end and rb represents an amount of data received actually. In this case, amount of data received by the server per second reps=rb/(tes−tss) and line quality (sdps−rdps)/sdps (wherein, sdps=sb/(tec−tsc)) represent tandem quality. With regard to line quality, the closer to zero it is, the higher it is.

When measuring plural times, it is possible to conduct detailed measurement by averaging values and by increasing or reducing an amount of data to be transferred. The results thus obtained are sent from the server to the client side as secondary information of measurement result message, and the client which received the results sends back a measurement result receipt message.

By measuring tandem quality in the tandem copying system in advance as stated above, it is possible to take measures such as reducing an amount of data by enhancing the compressibility of image data, in accordance with various situations including the occasion where line quality is poor when each copying machine transfers image data, the occasion where a large amount of data can not be transferred, and the occasion where the transfer speed is low.

As stated above, when a server is determined, all Ids registered in the server are delivered to each copying machine. It is also possible to deliver as path information by using secondary information of control specification information, or through another protocol (SNMP and others). Due to the same ID information shared commonly by various copying machines, tandem operations can be started from any copying machine.

For tandem operation itself, a data sending message has only to be sent to a copying machine with registered ID by the use of control specification information, and image data have only to be sent from image data transfer port through consideration of tandem quality. The copying machine on the receiving side starts tandem operations after receiving fixed data.

Incidentally, after the channel information is established by using the resident communication program, the image data are transmitted or received among the plurality of image forming apparatus connected with the network and the tandem image forming operation is conducted by the plurality of image forming apparatus. The tandem image forming operation is conducted in a similar manner conducted by a plurality of image forming apparatus connected through an exclusive cable, for example, disclosed by TOKUGANNHEI 10-005427.

There has been explained the tandem copying system wherein plural copying machines are connected to a network, and they exchange image data through the network to make copies and operate autonomously, as stated above, and this tandem copying system makes it possible to operate tandem copying machines without a special control server in the general purpose network, because each copying machine controls other copying machines each other. It is therefore possible to operate tandem copying machines in the ordinary network employing no exclusive cable. Therefore, less facility investment is required, and it is possible to structure the tandem copying system which is more complicated or more flexible compared with exclusive cable. Further, since there is no necessity for a specific control server which controls each copying machine, it is possible to structure the tandem copying system at lower cost and more simply.

Incidentally, the invention is not limited to the embodiment stated above, and the disclosed embodiment can be varied without departing from the spirit and scope of the invention. For example, in the tandem system, the invention is not limited only to a copying machine, but it can include an image forming apparatus such as other printers.

The tandem image forming system and the tandem image forming method make it possible to conduct tandem operations without a control server on the general purpose network to which a plurality of image forming apparatuses such as a copying machine are connected. Due to this, a specific control server is not required, and tandem image forming apparatuses can be operated on the ordinary network employing no exclusive cable. Therefore, less facility investment is required, and it is possible to structure the costless tandem image forming system which is more complicated or more flexible compared with exclusive cable.

What is claimed is:

1. An image forming apparatus, comprising:
   an interface connected to a network so as to send or receive data;
   a memory to store a resident communication program to communicate with another image forming apparatus through the network, wherein the resident communication program establishes channel information regarding data communication among a plurality of image forming apparatus connected with the network based on data regarding other image forming apparatus sent through the network;
   a recording device for forming an image on a recording medium based on image data; and
   an overall control device for controlling overall the image forming apparatus comprising the interface, the memory and the recording device.

2. The image forming apparatus of claim 1, wherein each of the plurality of image forming apparatus connected with the network is provided with identification information and the resident communication program establishes the channel information by comparing the identification information of each of the plurality of image forming apparatus such that one of the plurality of image forming apparatus is ranked as a server and the others of the plurality of image forming apparatus are ranked as clients.

3. An image forming system, comprising:
   a plurality of image forming apparatus each connected to a network capable of conducting a broadcast communication;

each of the plurality of image forming apparatus comprising a resident communication program to communicate with another image forming apparatus through the network, wherein the resident communication program establishes channel information regarding data communication among a plurality of image forming apparatus connected with the network based on data regarding other image forming apparatus sent through the network; and each of the plurality of image forming apparatus sending image data to or receiving the image data from other image forming apparatus on the basis of the channel information through the network and sharing image formation with others so as to conduct the image formation in parallel together with others.

4. The image forming system of claim 3, wherein each of the plurality of image forming apparatus is provided with identification information and the resident communication program establishes the channel information by comparing the identification information of each of the plurality of image forming apparatus such that one of the plurality of image forming apparatus is ranked as a server and the others of the plurality of image forming apparatus are ranked as clients.

5. The image forming system of claim 4, wherein time synchronization is conducted between the server and the clients.

6. The image forming system of claim 5, wherein data transmitting efficiency is obtained between the server and the clients and image data are transmitted among the plurality of image forming apparatus so as to conduct the image formation in parallel.

7. The image forming system of claim 6, wherein a compression rate of the image data is changed based on the data transmitting efficiency.

8. An image forming method of outputting images in parallel by a plurality of image forming apparatus connected to a network capable of conducting a broadcast communication, comprising steps of:

sending data regarding an image forming apparatus itself through the network;

receiving data regarding other image forming apparatus sent through the network;

establishing channel information regarding data communication among a plurality of image forming apparatus by a resident communication program based on the received data regarding the other image forming apparatus sent through the network;

sending the channel information to the other image forming apparatus through the network; and outputting images in parallel by the plurality of image forming apparatus based on the channel information.

9. The image forming method of claim 8, wherein the step of establishing channel information comprises comparing identification information provided to each of the plurality of image forming apparatus connected to the network and ranking one of the plurality of image forming apparatus as a server and the others of the plurality of image forming apparatus as clients based on the step of comparing.

10. The image forming method of claim 8, further comprising steps of:

conducting the time synchronization among the server and the clients before outputting images; and obtaining data transmitting efficiency between the server and the clients, wherein image data are transmitted among the plurality of image forming apparatus so as to conduct image formation in parallel.

11. The image forming method of claim 10, further comprising a step of:

changing a compression rate of the image data based on the data transmitting efficiency.

* * * * *